United States Patent

[11] 3,575,673

[72] Inventors Edward Joseph Biron, Jr.
Methuen;
Joseph Ignace Pelc, Andover, Mass.
[21] Appl. No. 779,437
[22] Filed Nov. 27, 1968
[45] Patented Apr. 20, 1971
[73] Assignee Western Electric Company, Incorporated
New York, N.Y.

[54] SYSTEMS FOR PULSE MODULATING A SIGNAL
8 Claims, 2 Drawing Figs.

[52] U.S. Cl. 332/9, 307/241, 307/265, 325/142, 328/58
[51] Int. Cl. H03k 7/08
[50] Field of Search 332/9, 9 (T); 307/265—267, 241—243; 328/58; 318/341; 325/142

[56] References Cited

UNITED STATES PATENTS

| | | | |
|---|---|---|---|
| 2,666,901 | 1/1954 | Lynn | 332/9 |
| 2,881,320 | 4/1959 | Goldberg | 307/243X |
| 3,263,188 | 7/1966 | Sloan | 307/242X |
| 3,387,213 | 6/1968 | Lender | 332/9X |
| 3,440,353 | 4/1969 | Salmet | 332/9X |

*Primary Examiner*—Alfred L. Brody
*Attorneys*—H. J. Winegar, R. P. Miller and S. Gundersen

ABSTRACT: A pulse signal of relatively wide pulse width is split into two similar gating signals. These signals are transmitted in parallel to two series-connected gates through paths of unequal effective lengths. Thus, a staggered reception of the gating signals provides a relatively short period of common enabling of the gates and an RF carrier signal is pulse modulated by the series-connected gates.

INVENTORS
E. J. BIRON, JR.
J. I. PELC
BY [signature]
ATTORNEY

SYSTEMS FOR PULSE MODULATING A SIGNAL

BACKGROUND OF THE INVENTION

This invention relates to methods, systems and circuits for gating signals and, more particularly, to the use of gating circuits and methods in pulse modulating an electrical carrier signal so as to generate pulse signals of very narrow pulse width.

Pulse signals of very narrow pulse width are useful in several fields, e.g., reflectometry testing of signal carrier equipment such as waveguides. It would be beneficial to utilize in these fields pulse generating apparatus which is presently commercially available, but which is not ordinarily capable of generating pulse signals of narrow enough pulse width. A method and circuitry to extend the utility of such commercially available apparatus by effectively narrowing the pulse width of the output pulse signals is, thus, obviously desirable.

SUMMARY OF THE INVENTION

An object of the invention resides in new and improved methods, systems and circuits for gating signals, such as in a system for pulse modulating a carrier signal to generate pulse signals of very narrow pulse width.

The invention contemplates the use of a gating circuit for selectively passing a carrier signal so as to modulate the carrier signal. A pair of gating or enabling signals act to modulate the carrier signal only during a simultaneous application of the two gating signals to the gating circuit. The applications of these gating signals to the gating circuit are staggered, such that the gating signals overlap in simultaneous application only during a portion of the time for which each individual gating signal is applied to the gating circuit.

The two gating signals may be provided by a single pulse generator of a type commercially available. A generated pulse signal is split into two component gating signals. One of these gating signals is delayed in its application to the gating circuit with respect to the application of the other gating signal to the gating circuit. By selecting an appropriate relative delay between the two individual applications of the gating signals to the gating circuit to provide a predetermined signal overlap, the carrier signal may be modulated to produce a resultant pulse signal of a pulse width considerably narrower than the width of the pulse signal generated initially by the commercial apparatus.

DETAILED DESCRIPTION

Figure 1:
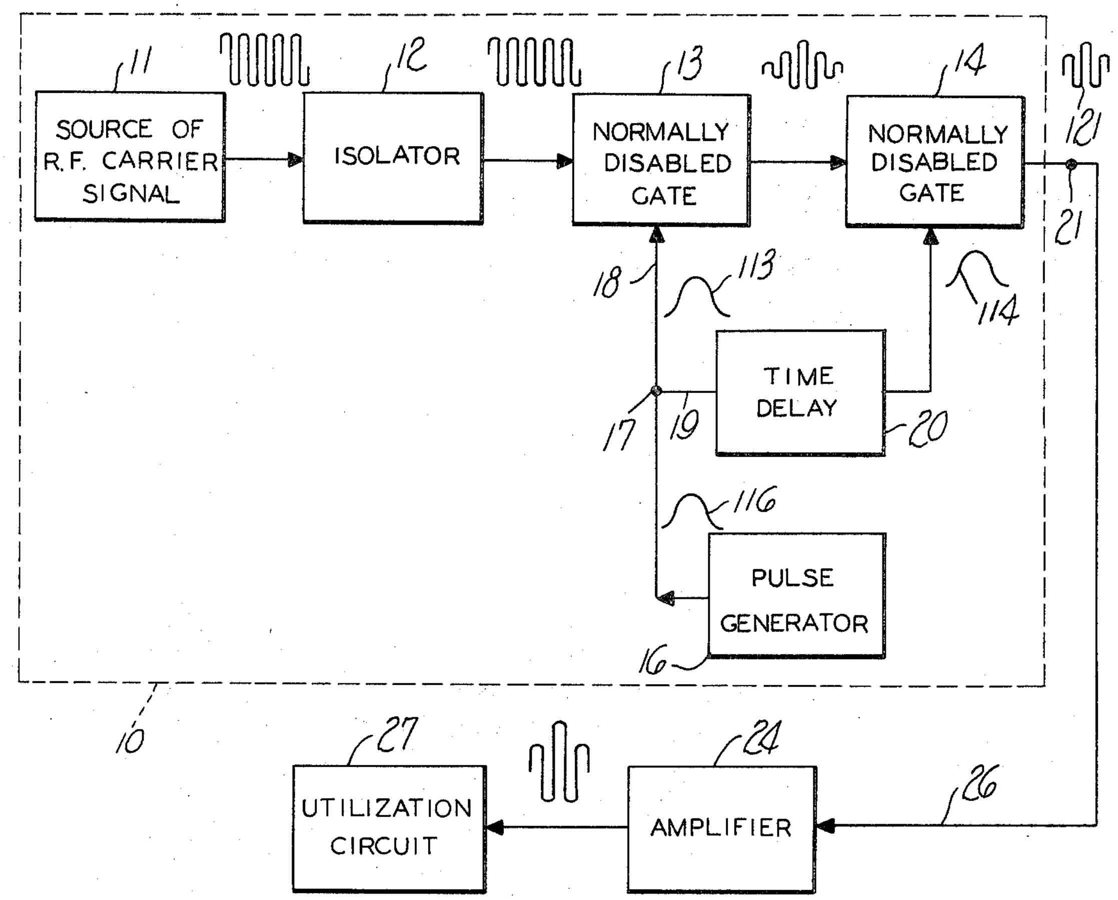
FIG. 1 is a block diagram illustration showing a gating system and circuit utilized in accordance with the principles of the invention for generating pulse signals of very narrow pulse width by pulse modulating a carrier signal in accordance with a predetermined signal gating scheme.

Turning first to FIG. 1, there is illustrated a system 10 in accordance with the principles of the invention for gating signals to produce pulse signals of very narrow pulse width, which signals may be used, for example, in reflectometry testing of wave guides and antenna systems. The system 10 includes a source 11 of an RF carrier signal, which may be adjustable to a selected frequency, an isolator 12 and a pair of series-connected, normally disabled gating devices 13 and 14 utilized as switches or pulse modulators. The gating devices 13 and 14 may be PIN modulators. These are preferred for their extremely fast rise time characteristics and their high frequency response. A pulse generator 16 of any known, commercially available type has a minimum pulse width, for example, of 100 nanoseconds. The pulse generator 16 is coupled to apply gating or enabling pulse signals to the gates 13 and 14 through a junction 17, such as a T junction, and a pair of cables, lines or other conductors 18 and 19. The conductor 19 includes a time delay circuit or device 20 for delaying the transmittal of a signal through the conductor 19. The time delay circuit is preferably adjustable to delay transmission of the signal by a selected delay period. Alternatively, the conductors 18 and 19 may be lines or cables of unequal lengths, with the cable 19 being longer than the cable 18 by a predetermined amount so as to provide the selected delay period to a signal transmitted through the cable 19. The conductor or cable 18 couples the pulse generator 16 through the junction 17 to the first gate 13 while the conductor or cable 19, which includes the time delay circuit 20, couples the pulse generator 16 through the junction 17 to the second gate 14.

The system 10 may be utilized to gate a signal, in particular the RF carrier signal from the source 11, so as to produce an output pulse signal of very narrow pulse width at an output terminal 21. A desired pulse width may be selected for the output pulse by an appropriate choice of the delay period for the time delay circuit 20. Thus, the staggered receptions of enabling pulses by the gates 13 and 14 may be overlapped during a time period of common enabling corresponding to the desired output pulse width, as will be further set forth hereinafter.

In order to utilize the system 10 to generate a pulse signal of very narrow pulse width by pulse modulating an RF carrier signal from the source 11, the pulse generator 16 is triggered in any suitable fashion, e.g., by the closing of a switch (not shown). In this manner, an initial pulse of relatively wide pulse width, e.g., 100 nanoseconds, will be generated. The 100 nanosecond pulse is split by the junction 17 into two similar component enabling pulses, each having a 100 nanosecond pulse width. These enabling pulses are transmitted by the conductors 18 and 19 and are applied, respectively, through the conductor 18 to the gate 13 and through the conductor 19 to the gate 14.

Since both of the series-connected gates 13 and 14 are normally disabled, an RF carrier signal is passed from the source 11 to the output terminal 21 only so long as enabling pulses are applied simultaneously to the two gates 13 and 14. If no separate time delay circuit 20 is employed, the relative lengths of cables 18 and 19 will have been selected such that the reception of the enabling pulse through the cable 18 by the gate 13 will precede by a predetermined time delay period the reception of the enabling pulse through the cable 19 by the gate 14. This predetermined time delay period, provided either by adjustment of the time delay circuit 20 or the use of a longer cable 19 of appropriate length, is selected to overlap the reception of the enabling pulses by the gates 13 and 14 during only a predetermined period of common enabling, substantially less than the pulse width of the pulse generated by the pulse generator 16. Thus, the RF carrier signal from the source 11 will be applied to the output terminal 21 in the form of RF pulse signals of very narrow pulse width, for example, 30 nanoseconds. It may be noted that the series-connected, normally disabled gates 13 and 14 function in the manner of a single AND gate, enabled only by the simultaneous application thereto of enabling pulses through the conductors or cables 18 and 19 to pass an RF carrier signal from the source 11.

Figure 2:
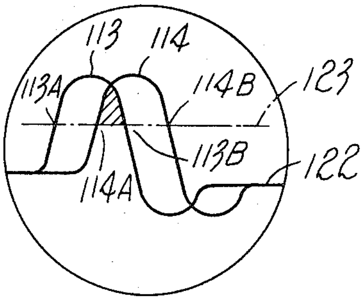
FIG. 2 is a schematic illustration of a display which may be observed on a dual trace oscilloscope by coupling the oscilloscope to sample a pair of pulse signals of relatively wide pulse width generated by a pulse generator device included in the system of FIG. 1, the reception of one of the pulse signals being delayed with respect to the reception of the other pulse signal.

The operation of the system 10 may be further understood from an observation of the waveforms illustrated in FIG. 1 and of the dual trace oscilloscope display depicted in FIG. 2. FIG. 2 shows representations of the enabling pulses 113 and 114 which would be received, respectively, by the gates 13 and 14, as might be observed on a dual trace oscilloscope connected to the conductors 18 and 19 at the ends thereof remote from the junction 17.

Each of the enabling pulses 113 and 114 would be similar to the pulse signal 116 (FIG. 1) generated by the pulse generator 16 and applied to the junction 17. The reception of the enabling pulse 114 by the gate 14, through the conductor 19 of longer effective length, however, would be delayed somewhat with respect to the reception of the enabling pulse 113 by the gate 13 through the conductor 18. Thus, the two enabling pulses 113 and 114 would overlap during the predetermined time period, which is less than the pulse width of the input pulse signal 116. If the input pulse signal 116 is assumed to have a 100 nanosecond pulse width, the partial overlap between reception of the enabling pulses 113 and 114 by the gates 13 and 14 might be reduced by the described method and subsystem to a pulse width of 30 nanoseconds, as viewed along a base line 122 of the dual trace oscilloscope display of FIG. 2.

In practice, the effective pulse width of an output pulse signal 121 (FIG. 1) at the terminal 21 may be further reduced by providing that the normally disabled gates 13 and 14 be enabled only by enabling pulse signals applying to the gates at least a selected minimum energy level, represented by a phantom line 123 in FIG. 2. The use of PIN modulators as the normally disabled gating devices 13 and 14 allows the selection of a suitable minimum energy level 123, e.g., 30 db., with extremely rapid enabling and disabling of the gates upon the pulse signals crossing this minimum energy level. Thus, the enabling pulse 113 (FIG. 2) would cause the gate 13 to be enabled continuously between the points 113A and 113B at which the signal respectively rises above and falls below the minimum energy level 123. Similar points 114A and 114B define the duration of enabling of the gate 14. The actual duration of common enabling for the gates 13 and 14 would, thus, correspond to the shaded zone shown in FIG. 2, commencing at the point 114A and terminating at the point 113B. This shaded zone represents the time during which a pulsed RF signal would be passed from the source 11 (FIG. 1) to the output terminal 21. In the manner heretofore described, a pulse signal 121 of 10 nanoseconds pulse width has been obtained at the terminal 21 with a pulse generator 16 capable of generating pulse signals having a 100 nanosecond minimum pulse width. The output signal 121 may be amplified by an amplifier 24 and transmitted by a line 26 to any selected utilization circuit or device 27 for which pulse signals of very narrow pulse width are desired.

The described system 10 has been illustrated as utilizing an RF carrier signal source 11. This type of carrier signal is useful with utilization circuits 27 employed in testing the quality of waveguides and antenna systems by time domain reflectometry techniques. It should be obvious, however, that other types of sources, including a DC energy source might be substituted for the source 11 in utilizing the system 10 to generate pulse signals of very narrow pulse width.

It is to be understood that the above-described system and method are simply illustrative of one embodiment of the invention. In an alternative embodiment, parallel-connected, normally enabled gates might be substituted for the gates 13 and 14 in FIG. 1. A negative-going output pulse signal of very narrow pulse width would then replace the signal 121. Another alternative embodiment might employ independent sources of pulse signals for generating the enabling pulses 113 and 114, suitable timing means being provided to overlap the enabling pulses for a predetermined time period. .Additionally, it may be observed that the principles of the invention might be applied advantageously in modifying signals of any type, e.g., pneumatic or hydraulic, rather than electrical signals. Many other modifications may be made without departing from the invention.

We claim:

1. In a system for pulse modulating an input signal:
a pair of series-connected, normally disabled gates;
means for coupling a first of said gates to receive said input signal;
a pulse generator;
junction means coupled to said pulse generator for splitting a generated pulse signal into two similar component pulse signals; and
means providing parallel paths between said junction means and said gates with said paths being of unequal effective lengths selected to apply the component pulse signals sequentially to said gates with the applications overlapping in time for enabling concurrently said gates during said time overlap, so as to pulse modulate a received input signal.

2. In a system as set forth in claim 1:
means for varying the effective length of one of said parallel paths.

3. In a system for generating a pulse signal of relatively narrow pulse width:
a first source of a carrier signal;
a second source of a pulse signal of relatively wide pulse width;
first normally disabled gating means coupled to receive the carrier signal from the first source and rendered effective by an application of a first enabling signal for transmitting the carrier signal;
second normally disabled gating means coupled to receive the carrier signal directly from the first gating means when transmitted upon application of the first enabling signal and rendered effective by an application of a second gating signal for transmitting the carrier signal;
first coupling means, coupling the second source to the first normally disabled gating means, for applying said pulse signal of relatively wide pulse width to the first normally disabled gating means to enable the first gating means during the application of said pulse signal; and
second coupling means, coupling the second source to the second normally disabled gating means and having a characteristic time delay period of less than the duration of said pulse of relatively wide pulse width, for applying said pulse signal of relatively wide pulse width to the second normally disabled gating means at the end of said time delay period to enable the second gating means during the application of the delayed pulse signal so as to enable the first and second gating means concurrently during a common time period less than the pulse width of the pulse signal from the second source and transmit the carrier signal as a pulse signal of relatively narrow pulse width during said common time period.

4. In a system as set forth in claim 3, said second coupling means comprising:
means for varying said time delay period to regulate the width of the pulse signal of relatively narrow pulse width.

5. In a system as set forth in claim 3:
said first coupling means comprising means defining a first signal transmission path of a first length for applying said pulse signal of relatively wide pulse width to the first normally disabled gating means; and
said second coupling means comprising means defining a second signal transmission path of a second length greater than said first length by a differential selected to establish said characteristic delay time for applying said pulse signal of relatively wide pulse width to the second normally disabled gating means at the end of the time delay period.

6. A system for pulse modulating a carrier signal which comprises:
a first normally disabled gate rendered effective by application of a first enabling signal for transmitting the carrier signal;
a second normally disabled gate coupled in series directly to the first gate and rendered effective by application of a second enabling signal for transmitting the signal from the first gate;
a pulse generator;
means coupled to the pulse generator for splitting a generated, pulse signal into first and second component signals of equal pulse width;

first coupling means for applying said first component signal as said first enabling signal to the first gate;

second coupling means for applying said second component signal as said second enabling signal to the second gate; and time delay means associated with the second coupling means and interposed between the pulse splitting means and the second gate for delaying application of the second component signal to the second gate during a time period less than the equal width of said first and second component signals to overlap partially the enabling of the first and second gates so as to transmit the carrier signal through the first and second gates during said partial overlap.

7. In combination with the system of claim 6:

means for varying said time period of the time delay means.

8. In a circuit for generating pulses at an output frequency which is a fractional multiple of a predetermined frequency:

a pair of normally disabled gating circuits connected in series;

means for generating initiating pulses at the predetermined frequency and for applying said initiating pulses to a first of said gating circuits;

means for generating enabling pulses of a width sufficient to span a plurality of said initiating pulses;

means for applying each enabling pulse to operate said first of said gating circuits;

means for delaying each enabling pulse for a period less than the width of said delayed enabling pulse to provide a period of overlap of each delayed enabling pulse with respect to the operation of the first gating circuit, which overlap period is at least equal to the duration of the period of an initiating pulse; and means for applying each delayed enabling pulse to operate the second of said gating circuits to pass output pulses at a fractional multiple of the predetermined frequency.